Patented Nov. 21, 1939

2,180,750

UNITED STATES PATENT OFFICE 2,180,750

MEAT CURING

Walter M. Urbain, Chicago, Ill., assignor to Industrial Patents Corporation, Chicago, Ill., a corporation of Delaware No Drawing. Application April 7, 1939,
Serial No. 266,644

7 Claims. (Cl. 99—159)

This invention relates to a method of curing meat.

One of the objects of the invention is to provide a simple curing method which will give assured results with respect to the color of the end product.

From the disclosure and the claims which follow other objects of the invention will be readily apparent to those skilled in the art of meat curing.

Broadly speaking, there are two accepted curing methods in vogue, that is, the pickle method and the dry salt cure method. The pickle method involves the preparation of a brine which is a water solution of certain curing salts, the most important of which is, of course, sodium chloride. Sodium nitrate is also used in conventional cures because it has some curative effect and is broken down by bacterial action into nitrite which has the effect of fixing the characteristic red color of cured meat. Other ingredients commonly used are sodium nitrite and sugars. When meats are cured by the pickle method, they are simply immersed in the pickle and permitted to remain until cured.

The dry salt method has its chief commercial importance in the curing of bacon, particularly bacon of high grade. In the case of dry salt cure it is conventional to pack bacon bellies in layers in boxes, the curing salt being sprinkled over and around each layer of bacon bellies. The time in cure, of course, varies, but about one month is ordinarily considered the proper curing time.

The dry salt cure presents many problems because frequently the curing mechanism is destroyed by unknown factors and although standard practice may have been followed with a given lot of bacon, it is found after the completion of the curing period to be of poor color, probably due to the failure of the nitrates to break down into nitrites or because of failure of the nitrites, whether derived from the nitrates in the curing salt mixture or directly added to the mixture, to perform the expected function of fixing color.

As has been pointed out both the pickle cure and the dry cure have disadvantages, the incorporation of water causing "wet" bacon in the pickle cure and the lack of moisture causing lacking of uniformity of cure in the case of the dry cure. The paste cure of the present invention avoids both of these objections.

The present invention is an improvement on the conventional dry salt cure and has been found in practice to effectively eliminate many of the objections inherent in the dry salt cure, particularly the failure of the conventional dry salt cure to assure proper color.

The present invention involves the preparation of a curing paste which includes the curing salts, water and starch which is spread over the meat to be cured before the meat is packed in boxes for the conventional curing period.

I do not attempt to explain the reason for the remarkable improvement in cure and color which is secured by the practice of the present invention, but the fact remains that the method of the present invention uniformly gives remarkably better results than the conventional dry salt cure.

In one instance in which the method of the present invention was employed the following formula was used:

| | Parts |
|---|---|
| Tapioca paste | 4000 |
| Sodium chloride | 1135 |
| Sucrose | 567 |
| Sodium nitrate | 174 |
| Sodium nitrite | 10 |
| Water | 500 |

The tapioca paste employed in this formula was prepared by cooking tapioca flour with water and phosphoric acid, so that the composition of the paste was 26 per cent flour. The flour employed is known on the market under the trade designation Imperial C Tapioca Flour. One and seventy-five hundredths per cent phosphoric acid was used and at the end of the cook, the phosphoric acid was neutralized with sodium hydroxide. The sodium chloride and sugar were worked into the paste and the sodium nitrate and nitrite were dissolved in the water and added to the paste-salt-sugar mixture. The mixture was spread over fresh pork bellies which were then packed in a box in accordance with conventional dry salt cure procedure. Approximately 2⅔ ounces of the paste mixture was employed per pound of meat. At the end of a month the bellies were pulled, washed and smoked and then sliced. The sliced bacon was held for seven days at 55 degrees Fahrenheit and upon inspection it was found that the bacon from this test had a more uniform and better color and was better cured than a lot of bacon which was concurrently cured by the conventional dry salt method.

Two lots of bacon cured in accordance with the present invention gave the following analyses:

| | Salt | Sodium nitrate | Sodium nitrite |
|---|---|---|---|
| | Percent | Percent | Percent |
| Lot 1 | 2.28 | 0.293 | 0.0036 |
| Lot 2 | 1.90 | 0.236 | 0.0039 |

In every instance of carrying out the present invention it was found that the presence of the flour and the nitrite result in a superior bacon from the color standpoint although the function of the flour is not understood.

The iodine test for starch when applied to the finished bacon is found to be negative, indicating that there is no incorporation of any appreciable quantity of starch in the bacon. It will be seen, therefore, that the present invention provides an improved method of curing which may be termed a paste cure as distinguished from either the pickle cure or the dry salt cure.

I claim:

1. The method of curing meat which comprises incorporating curing agents in a paste and applying the paste to the meat.

2. The method of curing meat which comprises subjecting meat to the action of a starch paste including curing agents.

3. The method of curing meat which comprises subjecting meat to the action of a tapioca paste including curing agents.

4. The method of curing meat which comprises subjecting the meat to the action of a paste containing starch and curing salts.

5. The method of curing meat which comprises covering the surface of meat with a paste containing starch and curing salts and storing the paste covered meat a sufficient length of time to permit completion of cure.

6. The method of preparing a curing paste which comprises mixing starch, curing salts and water in the form of a paste.

7. The method of preparing a curing paste which comprises mixing a neutralized phosphoric acid prepared tapioca flour with water, sugar and curing salts.

WALTER M. URBAIN.